Aug. 13, 1929.  T. M. SAMOUR  1,724,807
WIND WHEEL AND METHOD OF MAKING
Filed May 25, 1928
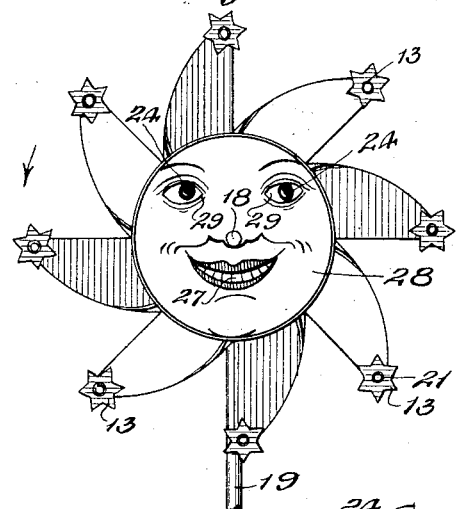
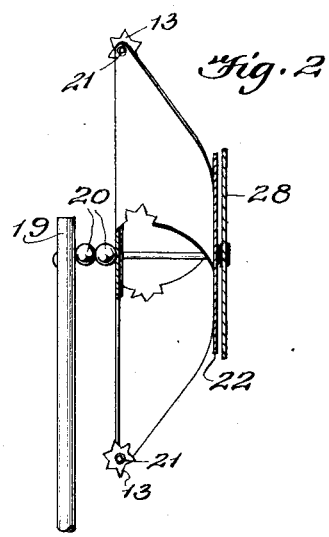
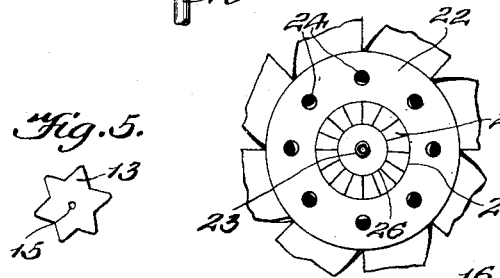
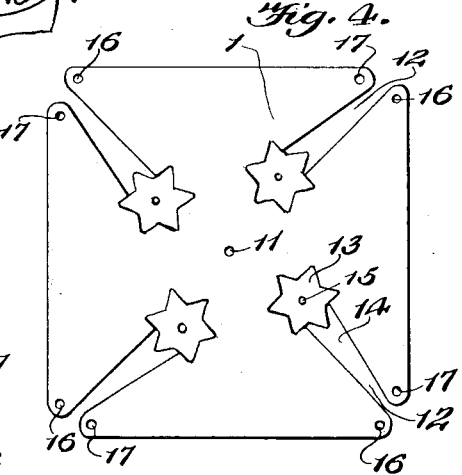
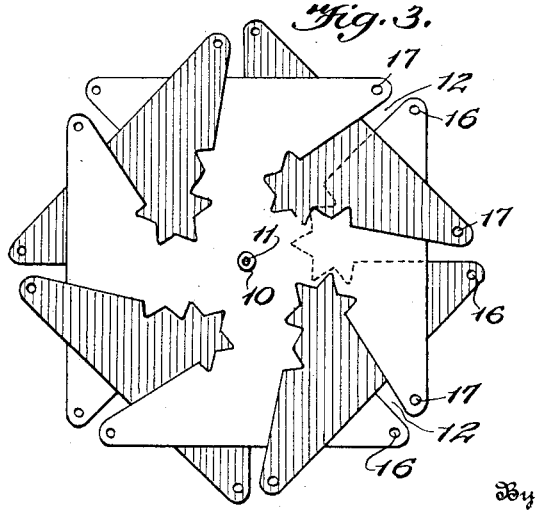
Inventor
Tegran M. Samour
Attorney Patented Aug. 13, 1929.

1,724,807

UNITED STATES PATENT OFFICE.

TEGRAN M. SAMOUR, OF ROSLINDALE, MASSACHUSETTS, ASSIGNOR TO ANOUSH M. SAMOUR, OF ROSLINDALE, MASSACHUSETTS.

WIND WHEEL AND METHOD OF MAKING.

Application filed May 25, 1928. Serial No. 280,526.

This invention relates to wind wheels and has for an object to provide a wind wheel of new and improved construction presenting new and improved features of attractiveness and operation.

A further object of the invention is to provide a method of making a wind wheel wherein certain parts of the material cut from the sheets composing the wind wheel are again attached to the wind wheel as ornamental and additional motor members with the several corners rounded to prevent damage to the user.

A further object of the invention is to provide a wind wheel having stationary disks and a rotating disk which together represent attractive or comical changeable display, as for instance the caricature of a face with the eyes and teeth moved by the movement of the wind wheel.

With these and other objects in view, the invention comprises certain novel parts, elements, units, combinations, constructions and interactions as disclosed in the drawings together with mechanical and functional equivalents thereof, as will be hereinafter more fully described and claimed.

In the drawings:

Figure 1 is a view of the wind wheel in front elevation.

Figure 2 is a substantially diametrical sectional view.

Figure 3 is a view in plan of the two separate sheets employed in the construction of the wheel and shown in the manner of interweaving before the ends are turned upwardly to form vanes.

Figure 4 is a plan view of one of the sheets, each sheet being identical.

Figure 5 is a plan view of one of the ornamental members cut from the sheet and applied to the ends of the vanes.

Figure 6 is a view in front elevation of one of the disks entering into the face caricature.

Like characters of reference indicate corresponding parts throughout the several views.

In the method of making the present wind wheel a sheet of material of any approved type, as for instance sheet celluloid, is employed and is cut by the proper dies to the form indicated at Figure 4. For the purpose of attractiveness in appearance only, the completed wind wheel will be composed of two of the blanks, as shown at Figure 4, of contrasting color. It is to be understood, of course, that the color does not enter into the present application and that the shading wherever it appears upon any of the drawings is merely for the purpose of definition and not as indicating any definite colors or any differentiation of colors. Two of the blanks as shown at Figure 4 are secured together at the center by an eyelet 10, which is inserted through the center openings 11 cut in the blank at the time it is stamped. To enable the two blanks thus interconnected to be properly interwoven so that the ends may be bent to proper location, cuts 12 are formed extending substantially from the corners of the blanks and in general substantially radially toward the center opening 11. These cuts 12 are continued and so formed as to produce a cutout part 13 independent of the section 14 which latter part may be discarded but the ornamental part 13 provided with a central perforation 15 is employed as will be hereinafter more fully described. The blank is also provided at its several extremities formed by the cuts 12 with perforations 16 and 17. The two blanks thus cut and interconnected at their centers by the eyelet 10 are interwoven by rotating one of the blanks an eighth of a turn to the position shown at Figure 3 and interwoven as there indicated. The wheel is completed by turning up the points carrying the perforations 17 and inserting therethrough a pintle 18, which said pintle is inserted through all of the several points 17 and through the central opening 11 and continued to a handle or staff 19 by which the device is held in the hand. Means for spacing the wheel away from the staff is indicated convenitionally at 20 and any convenient type of device may be employed for the purpose. The ornamental members, shown in the drawings as stars with rounded points, are at this stage, or any other stage as may be found convenient, attached to the points 16 by means of eyelets 21 which are inserted through the central openings 15 of these ornamental members and through the openings 16 in the points of the blank so that they assume the position shown at Figures 1 and 2. The turning up of the points carrying the openings 17 serve to curve the whole section of the sheet connected therewith to such a relative position that a current of air striking in front or substantially at the front will tend to rotate the wind wheel in the direction indicated by the arrow at Figure 1. There is secured to the wheel thus completed a disk shown in entirety at Figure 6, being preferably a circular piece of sheet material 22, such as cardboard or the like. The disk may be secured to the front part of the wind wheel in any approved manner, but preferably is attached during the making of the wheel by employing an eyelet 23 which is inserted through the disk 22 and through the several perforations 17 so that all of these members are held firmly together by the eyelet even in advance of the application thereto of the pintle 18. The disk 22 is provided with any elected display as a circular row of circular figures 24, as indicated at Figures 1 and 6, and a pair of inner concentric circles 25 and 26 connected by radially extending short lines 27. Rigidly secured to the pintle 18 in any approved manner is another disk 28 which is provided with cutouts of appropriate shape and position to coact with the said display on the disk 24, as the openings 29 and 30 properly proportioned and positioned to co-act with the circular figures 24 and the radial lines 27 to indicate eyes and teeth shown through the openings 29 and 30 as indicated more particularly at Figure 1. When the wind wheel rotates, carrying therewith the disk 22 in the rear of the disk 28, the eyes and teeth move with the wind wheel, giving to the caricature of the face a weird and attractive appearance. The particular displays and cutouts as shown are only indicative of the general type of display which may be employed as elected.

What I claim to be new is:

1. A wind wheel having a plurality of vanes composed of sheet material properly curved to re-act against an air current, a journal member inserted axially through the wheel, a disk secured to the wheel and provided with a circle of dots concentric to the center and a circle of radially extending short lines within the circle of dots and concentric with the center, a second disk superposed upon the first mentioned disk and secured to the journaling member and remaining stationary therewith and provided with openings properly spaced to expose some of the configuration appearing upon the rotating disk.

2. A wind wheel comprising vanes of sheet material properly curved to re-act against an air current to rotate, a journaling member to facilitate rotation, a disk carried by the wind wheel and rotating therewith, said disk being provided with a row of dots concentric with the center, said dots representing eyeballs, a row of short radial lines concentric with the center, a second disk secured to and remaining stationary with the journaling member and provided with openings coinciding with the dots to represent eyes, and another opening coinciding with the radial lines to represent an open mouth and exposed teeth.

In testimony whereof I affix my signature.

TEGRAN M. SAMOUR.